US012586740B2

(12) United States Patent
Wang

(10) Patent No.: US 12,586,740 B2
(45) Date of Patent: Mar. 24, 2026

(54) STACK KEY STRUCTURE AND BALANCE-SHAFT SEAT THEREOF

(71) Applicant: Voyetra Turtle Beach, Inc., San Diego, CA (US)

(72) Inventor: Wei Chuan Wang, New Taipei City (TW)

(73) Assignee: Voyetra Turtle Beach, Inc., San Diego, CA (US)

( * ) Notice: Subject to any disclaimer, the term of this patent is extended or adjusted under 35 U.S.C. 154(b) by 140 days.

(21) Appl. No.: 18/559,612

(22) PCT Filed: May 4, 2022

(86) PCT No.: PCT/US2022/027603
§ 371 (c)(1),
(2) Date: Nov. 8, 2023

(87) PCT Pub. No.: WO2022/240629
PCT Pub. Date: Nov. 17, 2022

(65) Prior Publication Data

US 2024/0234049 A1 Jul. 11, 2024

(30) Foreign Application Priority Data

May 10, 2021 (TW) ................................ 110205252
May 14, 2021 (CN) ......................... 202121030255.4

(51) Int. Cl.
*H01H 13/20* (2006.01)
*H01H 13/14* (2006.01)

(52) U.S. Cl.
CPC ........... *H01H 13/20* (2013.01); *H01H 13/14* (2013.01)

(58) Field of Classification Search
CPC .. H01H 13/20; H01H 13/14; H01H 2217/004; H01H 13/705; H01H 3/122;
(Continued)

(56) References Cited

U.S. PATENT DOCUMENTS 6,171,003 B1 1/2001 Lo
11,755,125 B1 * 9/2023 Norbauer ............. G06F 3/0224
345/168

(Continued)

FOREIGN PATENT DOCUMENTS

WO 2021053569 3/2021

*Primary Examiner* — Lheiren Mae A Caroc
(74) *Attorney, Agent, or Firm* — Sheppard Mullin Richter & Hampton LLP

(57) ABSTRACT

A key structure may include a switch shaft sleeve seat and a switch shaft accommodated in the switch shaft sleeve seat, where an end of the switch shaft penetrates the switch shaft sleeve seat and is movable relative to the switch shaft sleeve seat; two balance shaft sleeve seats on sides of the switch shaft sleeve seat, where each of the balance shaft sleeve seats may include a sleeve body and a top of each sleeve body may include a through hole. Moreover, the key structure may include two balance shafts respectively accommodated disposed in the sleeve bodies, where top ends of the balance shafts penetrate the through holes. Also, the key structure may include a key cap arranged above the switch shaft sleeve seat and the two balance shaft sleeve seats and fixedly connected to the switch shaft and the two balance shafts.

14 Claims, 6 Drawing Sheets

(58) Field of Classification Search
CPC ...... H01H 3/06; H01H 2221/026; H01H 3/12; H01H 3/125; H01H 13/7065
See application file for complete search history.

(56) References Cited

U.S. PATENT DOCUMENTS

| | | | | |
|---|---|---|---|---|
| 2003/0103359 | A1 | 6/2003 | Chiang et al. | |
| 2009/0174579 | A1 | 7/2009 | Liu | |
| 2014/0216905 | A1 | 8/2014 | Ma et al. | |
| 2015/0001059 | A1 | 1/2015 | Lin et al. | |
| 2020/0126737 | A1 | 4/2020 | Wu | |
| 2023/0050678 | A1* | 2/2023 | Wang | H01H 13/20 |

* cited by examiner

STACK KEY STRUCTURE AND BALANCE-SHAFT SEAT THEREOF

CROSS-REFERENCE TO RELATED APPLICATIONS

This application is a National Phase application under 35 U.S.C. § 371 of PCT Application No. PCT/US2022/027603, filed May 4, 2022, which application claims the benefit of Chinese Patent Application No. 202121030255.4, filed May 14, 2021 (which issued as Chinese Patent No. ZL 202121030255.4 on Mar. 25, 2022), and Taiwan Patent Application No. 110205252, filed May 10, 2021 (which issued as Taiwan Patent No. M618908 on Nov. 1, 2021), which are hereby incorporated herein by reference in their entirety.

TECHNICAL FIELD

The present disclosure relates to a key structure such as a multiple key, and in particular some embodiments relate to a key structure and a balance shaft sleeve seat thereof.

BACKGROUND

Multiple keys (for example: Space, Enter, Caps Lock, Shift and so on) of the mechanical keyboard have long key caps, so switch shafts can only be supported in the center of the key caps. When two ends of a key cap of a multiple key are pressed, a force application point and a pivot point of the switch shaft will deviate by a distance, which will cause the key cap to skew and fail to trigger the switch shaft correctly.

Therefore, the traditional multiple key structure will be equipped with two balance shafts on two sides of the switch shaft, and the switch shaft and the two balance shafts together support the key cap, so that the key cap can be balanced with the two balance shafts by means of the switch shaft during the pressing process, so as to ensure that the switch shaft can be triggered correctly when being pressed. In addition, two balance shaft sleeve seats are sleeved on the outside of the two balance shafts to guide the two balance shafts to move up and down steadily.

However, in order to save manufacturing costs, two balance shaft sleeve seats can be injection molded with the same mold. The structural design of the above balance shaft sleeve seat will be symmetrical in the left and right direction with a center line of a major axis as a reference. However, this design causes the left and right sides of the balance shaft sleeve seat to be limited in structure and width, which in turn leads to the limitations on the structure and width of the switch shaft sleeve seat sleeved on the outside of the switch shaft.

BRIEF SUMMARY

An objective of the present invention is to provide a key structure and a balance shaft sleeve seat thereof, which utilizes a balance shaft sleeve seat whose left and right sides can be different in structure and width, so that the structure and width of the balance shaft sleeve seat are more free and unlimited in design.

In one embodiment, a key structure comprises: a switch shaft sleeve seat; a switch shaft accommodated in the switch shaft sleeve seat, wherein a top end of the switch shaft penetrates the top of the switch shaft sleeve seat and can move up and down relative to the switch shaft sleeve seat; two balance shaft sleeve seats arranged on two sides of the switch shaft sleeve seat, wherein each of the balance shaft sleeve seats has a sleeve body, a side of each of the sleeve bodies has an adjacent side edge arranged adjacent to the switch shaft sleeve seat, and the top of each of the sleeve bodies is provided with a through hole located in the middle of the adjacent side edge, each of the through holes defines a central axis and a minor axis plane and a major axis plane intersecting at the central axis, the minor axis planes are arranged perpendicular to the adjacent side edges, the major axis planes are arranged perpendicular to the minor axis planes, and the appearance of each of the sleeve bodies is symmetrically set with the minor axis plane as a reference and asymmetrically set with the major axis plane as a reference; two balance shafts respectively accommodated in the two sleeve bodies, wherein top ends of the balance shafts penetrate the through holes; and a key cap arranged above the switch shaft sleeve seat and the two balance shaft sleeve seats and fixedly connected to the switch shaft and the two balance shafts.

In some embodiments, the key structure further comprises a fixing plate, the switch shaft sleeve seat and the sleeve bodies are connected to the fixing plate in a penetrating manner, an annular stopper extends from the outside of each of the sleeve bodies, and the annular stoppers are arranged below the fixing plate and are stopped and limited by the fixing plate.

In some embodiments, each of the sleeve bodies has two transverse side walls and a longitudinal side wall connected on a side of the two transverse side walls, and is provided with a transparent indentation formed on the other side of the two transverse side walls, and each two transverse side walls are symmetrically set with the minor axis planes as a reference.

In some embodiments, each of the annular stoppers has two transverse sections and a first longitudinal section and a second longitudinal section connected on two sides of the two transverse sections, an interval space is formed between the transverse sections and the transverse side walls, each two transverse sections are symmetrically set with the minor axis planes as a reference, the first longitudinal sections are molded by extending integrally with the longitudinal side walls, and the second longitudinal sections are arranged corresponding to the transparent indentations and are molded by extending integrally with each two transverse side walls.

In some embodiments, the key structure further comprises a balance rod, each of the second longitudinal sections is recessed from the top with two concave furrows that are symmetrically set with the minor axis planes as a reference, each two transverse side walls is provided with two penetrating holes that are symmetrically set with the minor axis planes as a reference, and the balance rod penetrates one of the two concave furrows and one of the two penetrating holes, and is pivotally connected to the two balance shafts at two ends.

In some embodiments, the balance rod has a transverse rod and two longitudinal rods extending from two ends of the transverse rod, and two ends of the transverse rod each penetrate one of each two concave furrows, and the longitudinal rods each penetrate one of each two penetrating holes.

In some embodiments, two first protrusions that are symmetrically set with the minor axis planes as a reference extend from inner sides of each two transverse side walls, two second protrusions extend from two sides of the balance shafts, and the second protrusions are arranged below the first protrusions and are stopped and limited by the first protrusions.

In some embodiments, two inclined protruding pieces that are symmetrically set with the minor axis planes as a reference extend from outer sides of each two transverse side walls, each two inclined protruding pieces gradually increase in distance toward the annular stoppers, and each two inclined protruding pieces are arranged above the fixing plate and are stopped and limited by the fixing plate.

In some embodiments, an embedding groove is provided on an outer side of each of the second longitudinal sections, the embedding grooves have a shape that is symmetrically set with the minor axis planes as a reference, two clamping hooks embedded into the embedding grooves extend from two sides of the switch shaft sleeve seat, and the two clamping hooks are arranged below the fixing plate and are stopped and limited by the fixing plate.

In some embodiments, the invention comprises a balance shaft sleeve seat of a key structure, wherein the key structure has a switch shaft sleeve seat, and the balance shaft sleeve seat comprises: a sleeve body, a side of which has an adjacent side edge arranged adjacent to the switch shaft sleeve seat, and a top of which is provided with a through hole located in the middle of the adjacent side edge, wherein the through hole defines a central axis and a minor axis plane and a major axis plane intersecting at the central axis, the minor axis plane is arranged perpendicular to the adjacent side edge, the major axis plane is arranged perpendicular to the minor axis plane, and the appearance of the sleeve body is symmetrically set with the minor axis plane as a reference and asymmetrically set with the major axis plane as a reference.

In some embodiments, the sleeve body has two transverse side walls and a longitudinal side wall connected on a side of the two transverse side walls, and is provided with a transparent indentation formed on the other side of the two transverse side walls, and the two transverse side walls are symmetrically set with the minor axis plane as a reference.

In some embodiments, an annular stopper extends from the outside of the sleeve body, the annular stopper has two transverse sections and a first longitudinal section and a second longitudinal section connected on two sides of the two transverse sections, an interval space is formed between the transverse sections and the transverse side walls, the two transverse sections are symmetrically set with the minor axis plane as a reference, the first longitudinal section is integrally extended and molded with the longitudinal side wall, and the second longitudinal section is arranged corresponding to the transparent indentation and is integrally extended and molded with the two transverse side wall.

In some embodiments, the second longitudinal section is recessed from the top with two concave furrows that are symmetrically set with the minor axis plane as a reference, the two transverse side walls are provided with two penetrating holes that are symmetrically set with the minor axis plane as a reference, an embedding groove is provided on an outer side of the second longitudinal section, and a shape of the embedding groove is symmetrically set with the minor axis plane as a reference.

In some embodiments, two first protrusions that are symmetrically set with the minor axis plane as a reference extend from inner sides of the two transverse side walls, two inclined protruding pieces that are symmetrically set with the minor axis plane as a reference extend from outer sides of the two transverse side walls, and the two inclined protruding pieces gradually increase in distance toward the annular stop.

In some embodiments, the appearance of the sleeve body is symmetrical in the up and down direction with the minor axis plane as a reference, and the appearance of the sleeve body is asymmetrical in the left and right direction with the major axis plane as reference. Therefore, the left and right sides of the balance shaft sleeve seat can be different in structure and width, so that the structure and width of the balance shaft sleeve seat is more free and unlimited in design, thereby allowing the distance between the balance shaft sleeve seat and the switch shaft sleeve seat to increase. As a result, the structure and width of the switch shaft sleeve seat have space to change, so as to achieve the advantage of free appearance design of the balance shaft sleeve seat and the switch shaft sleeve seat.

Figure 1:
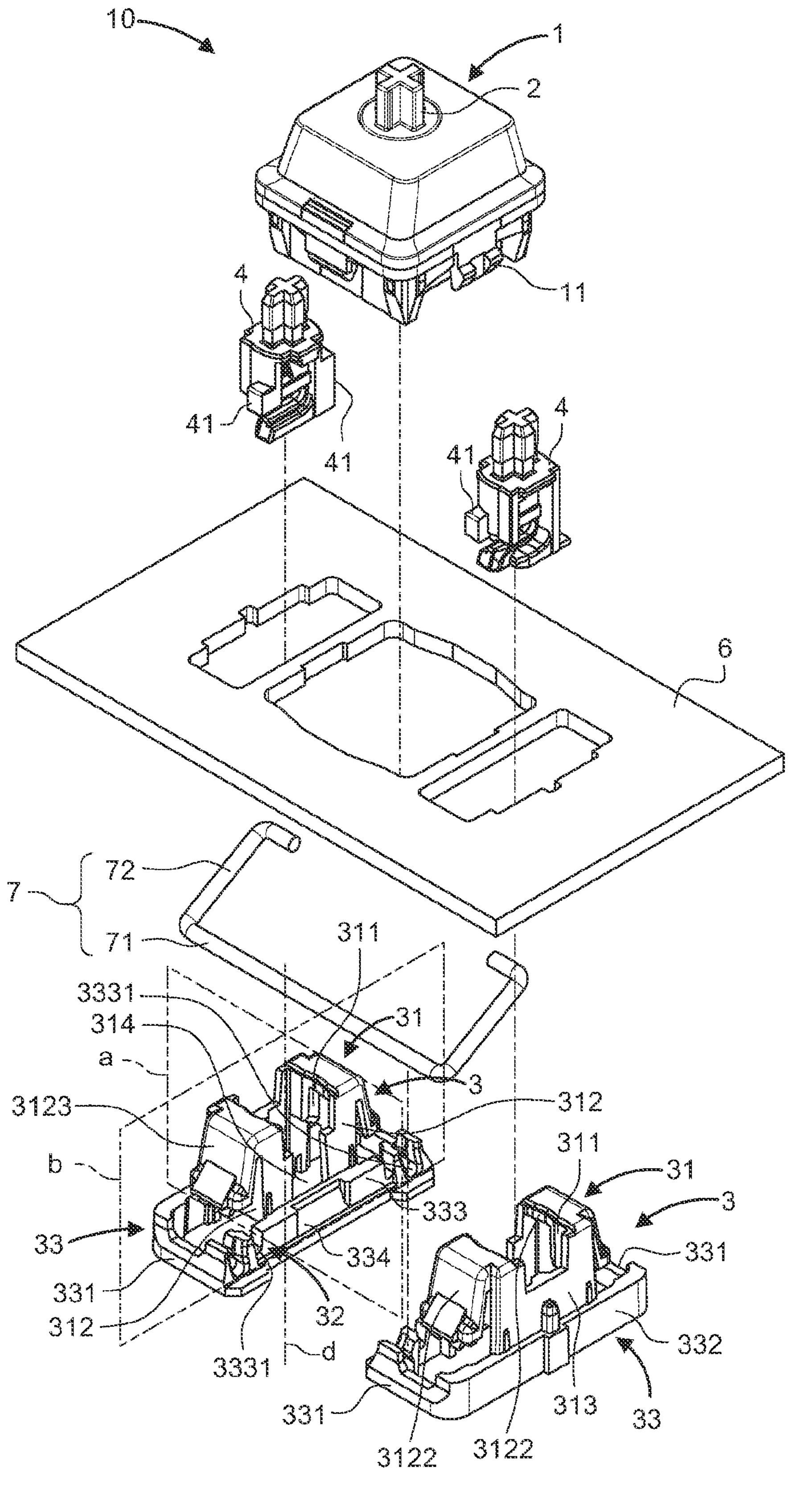
FIG. 1 is a perspective exploded view of a key structure.
Figure 2:
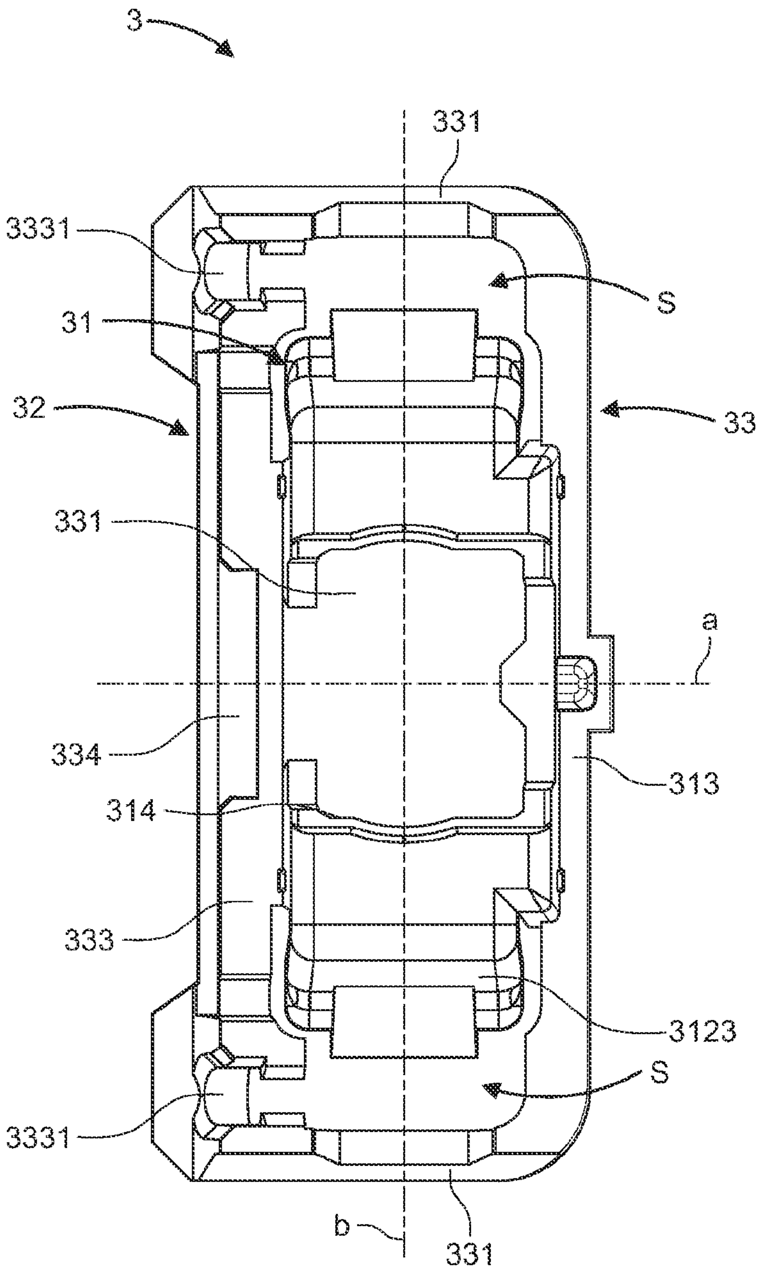
FIG. 2 is a schematic top view of a balance shaft sleeve seat.
Figure 3:
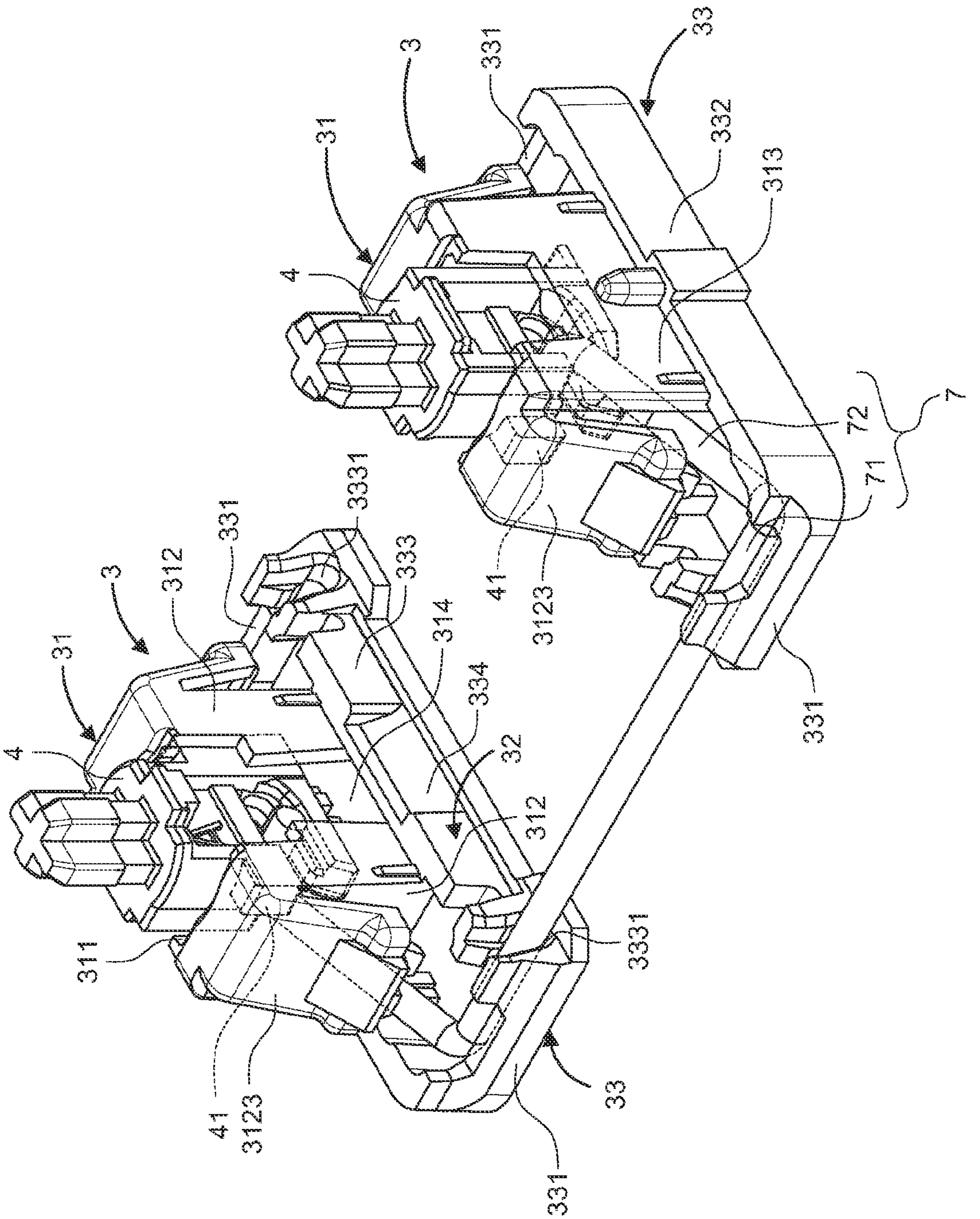
FIG. 3 is a perspective assembly view of the balance shaft sleeve seat, a balance shaft and a balance rod.

10: key structure; 1: switch shaft sleeve seat; 11: clamping hook; 2: switch shaft; 3: balance shaft sleeve seat; 31: sleeve body; 311: through hole; 312: transverse side wall; 3121: penetrating hole; 3122: first protrusion; 3123: inclined protruding piece; 313: longitudinal side wall; 314: transparent indentation; 32: adjacent side edge; 33: annular stopper; 331: transverse section; 332: first longitudinal section; 333: second longitudinal section; 3331: concave furrow; 334: embedded groove; 4: balance shaft; 41: second protrusion; 5: key cap; 6: fixing plate; 7: balance rod; 71: transverse rod; 72: longitudinal rod; a: minor axis plane; b: major axis plane; d: central axis; s: interval space.

DETAILED DESCRIPTION

The detailed description and technical content of embodiments of the present invention will be described below in conjunction with the accompanying drawings. However, the accompanying drawings are only for illustrative purposes and are not used to limit the present invention.

Referring to FIGS. 1 to 6, embodiments provide a key structure and its balance shaft sleeve seat. The key structure 10 mainly comprises a switch shaft sleeve seat 1, a switch shaft 2, two balance shaft sleeves 3, two balance shafts 4 and a key cap 5.

Figure 4:
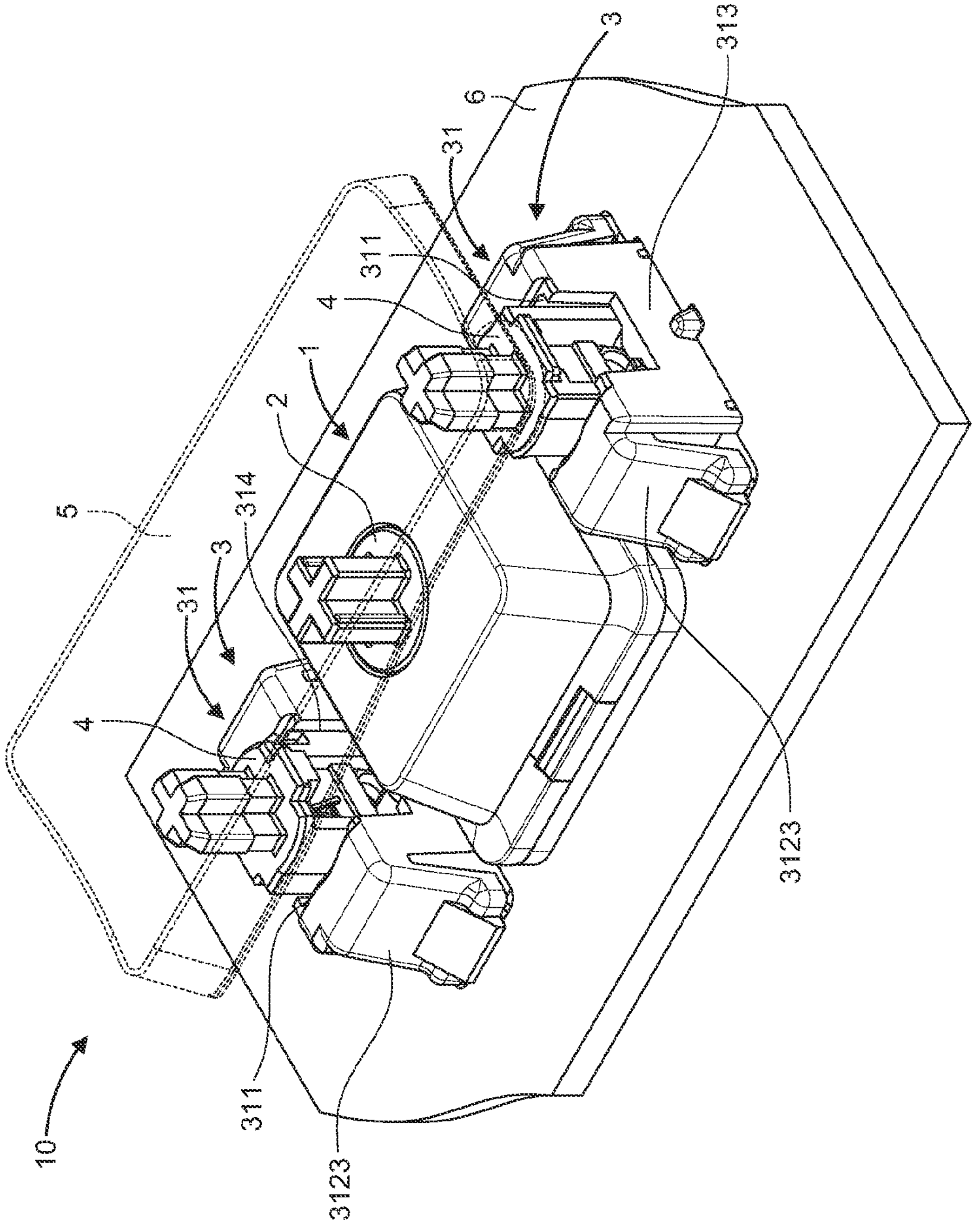
FIG. 4 is a perspective assembly view of the balance shaft sleeve seat.
Figure 5:
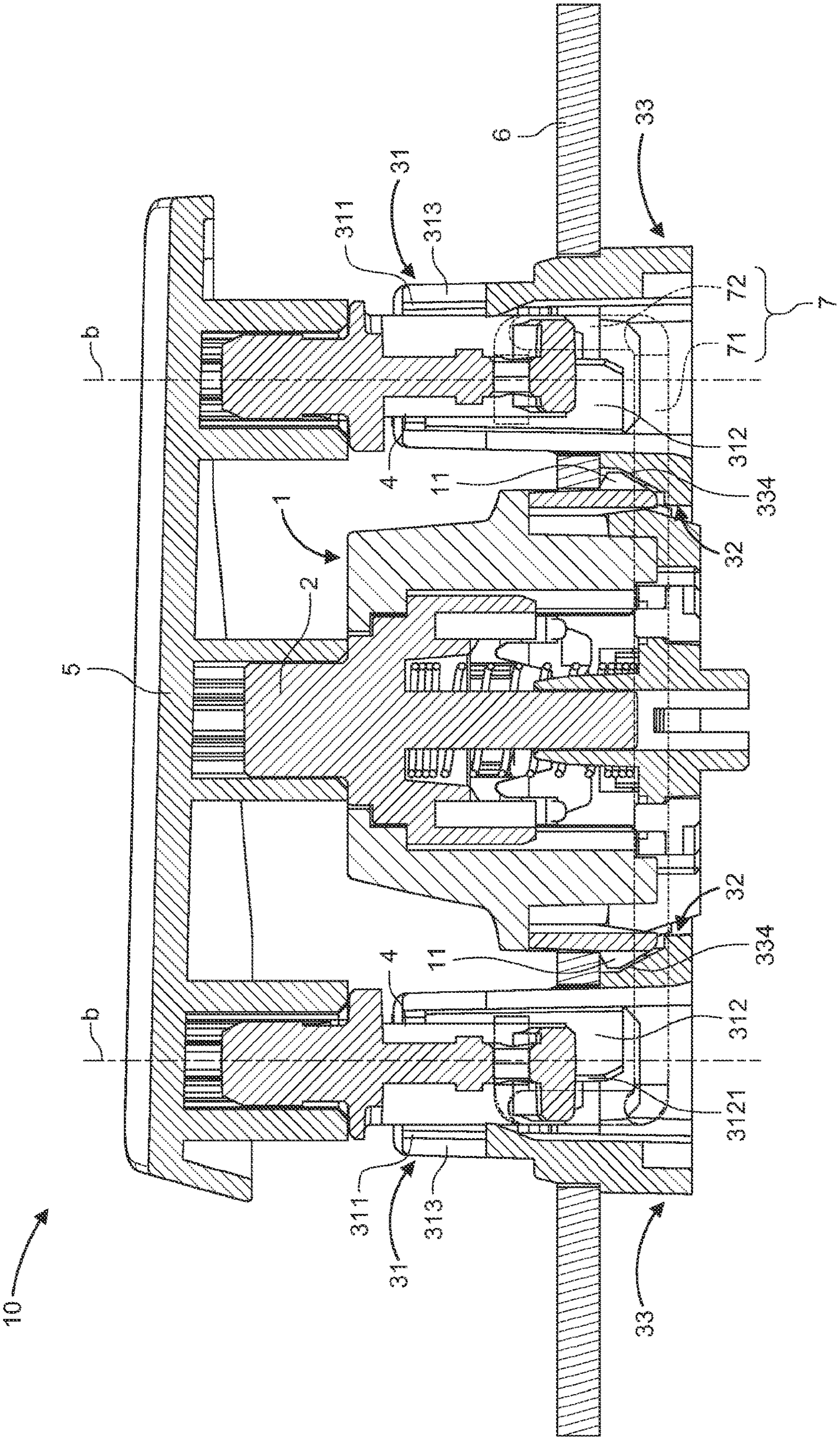
FIG. 5 is a schematic cross-sectional view of the key structure.

As shown in FIGS. 1 and 4 to 5, two clamping hooks 11 extend from two sides of the switch shaft sleeve seat 1. The switch shaft 2 is accommodated in the switch shaft sleeve seat 1. A top end of the switch shaft 2 penetrates the top of the switch shaft sleeve seat 1, and a spring (not shown in the figures) is sandwiched between the switch shaft 2 and the switch shaft sleeve seat 1, so that the switch shaft 2 can move up and down relative to the switch shaft sleeve seat 1. Moreover, a trigger switch (not shown in the figures) is installed below the switch shaft 2. The trigger switch (not shown in the figures) is a photoelectric switch, a membrane switch, a mechanical switch or a magnetic induction switch. When the switch shaft 2 moves downwardly, it can touch and press the trigger switch (not shown in the figures).

As shown in FIGS. 1 to 6, the two balance shaft sleeve seats are arranged on two sides of the switch shaft sleeve seat 1. Each balance shaft sleeve seat has a sleeve body 31. A side of each sleeve body 31 has an adjacent side edge 32 arranged adjacent to the switch shaft sleeve seat 1, and the top of each sleeve body 31 is provided with a through hole 311 located in the middle of the adjacent side edge 32. Each through hole defines a central axis d and a minor axis plane a and a major axis plane b intersecting at the central axis d. The minor axis planes a are arranged perpendicular to the adjacent side edges 32, and the major axis planes b are arranged perpendicular to the minor axis planes a. The appearance of each sleeve body 31 is symmetrically set with the minor axis plane a as a reference, and the appearance of each sleeve body 31 is asymmetrically set with the major axis plane b as a reference.

Each sleeve body 31 has two transverse side walls 312, and a longitudinal side wall 313 connected on a side of the two transverse side walls 312, and is provided with a transparent indentation 314 formed on the other side of the two transverse side walls 312, so that each sleeve body 31 is a U-shaped frame body, and each two transverse side walls 312 are symmetrically set with the minor axis planes a as a reference. The transparent indentations 314 are arranged at positions closer to the switch shaft sleeve seat 1 than the longitudinal side walls 313.

In addition, each two transverse side walls 312 are provided with two penetrating holes 3121 that are symmetrically set with the minor axis planes a as a reference, and each second longitudinal section 333 is recessed from the top with two concave furrows 3331 that are symmetrically set with the minor axis planes a as a reference.

Furthermore, two first protrusions 3122 that are symmetrically set with the minor axis planes a as a reference extend from inner sides of each two transverse side walls 312. Two inclined protruding pieces 3123 that are symmetrically set with the minor axis planes a as a reference extend from outer sides of each two transverse side walls 312. Each two inclined protruding pieces 3123 gradually increase in distance toward the annular stoppers 33.

Further, an annular stopper 33 extends from the outside of each sleeve body 31. Each annular stopper 33 has two transverse sections 331 and a first longitudinal section 332 and a second longitudinal section 333 connected on two sides of the two transverse sections 331. An interval space s is formed between the transverse sections 331 and the transverse side walls 312. Each two transverse sections 331 are symmetrically set with the minor axis planes a as a reference. The first longitudinal sections are molded by extending integrally with the longitudinal side walls 313, and the second longitudinal sections 333 are arranged corresponding to the transparent indentations 314 and are molded by extending integrally with each two transverse side walls 312. Each second longitudinal sections 333 are arranged closer to the switch shaft sleeve seat 1 than the first longitudinal sections 332.

In addition, an embedding groove 334 is provided on an outer side of each second longitudinal section 333. The embedding grooves 334 have a shape that is symmetrically set with the minor axis planes a as a reference. The clamping hooks 11 are embedded into the embedding grooves 334.

As shown in FIGS. 1 and 3 to 6, the two balance shafts 4 are accommodated in two sleeve bodies 31, respectively. Top ends of the balance shafts 4 penetrate the through holes 311. Two second protrusions 41 extend from two sides of the balance shafts 4. The second protrusions 41 are arranged below the first protrusions 3122 and are stopped and limited by the first protrusions 3122.

Figure 6:
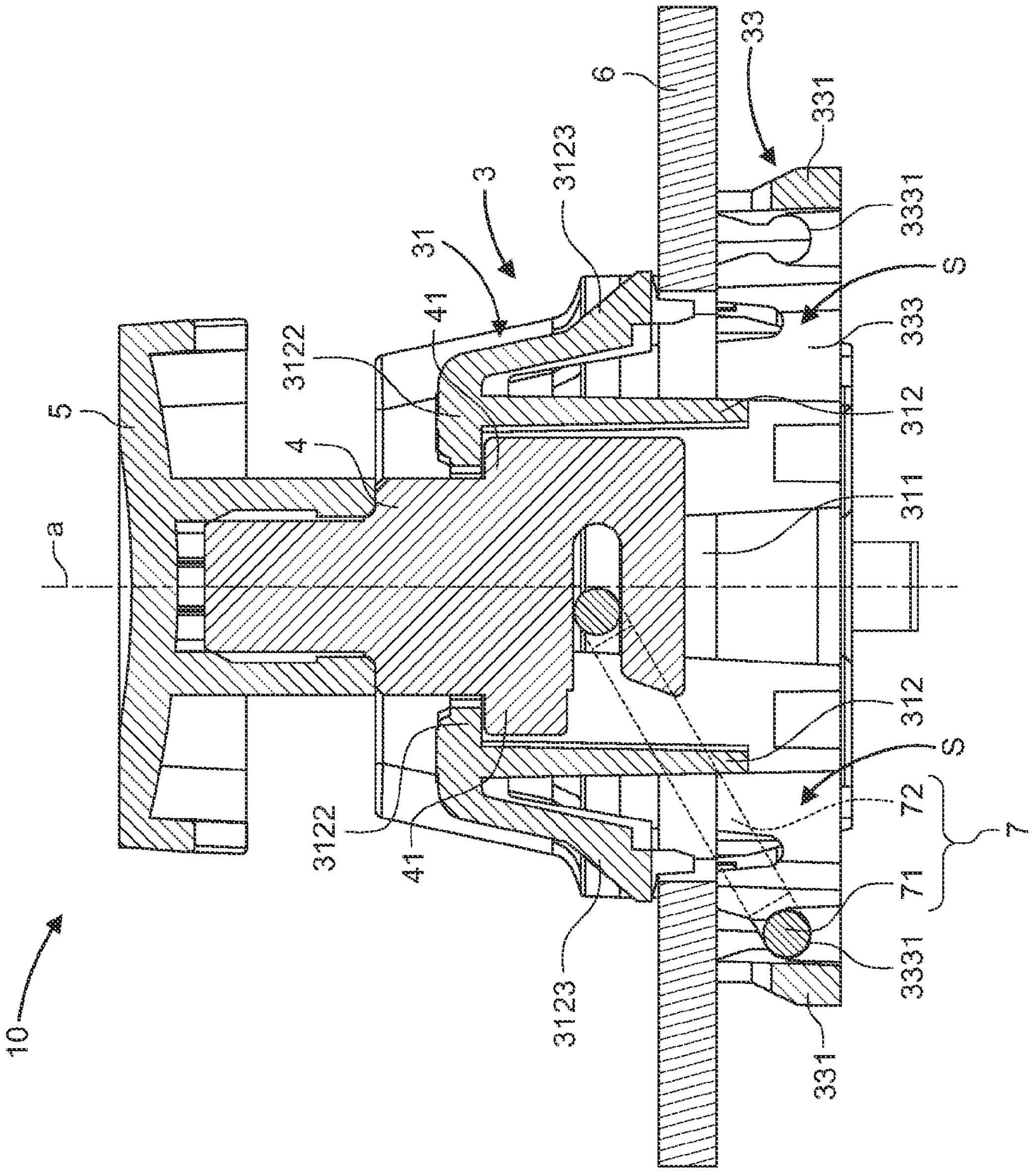
FIG. 6 is another schematic cross-sectional view of the key structure.

As shown in FIGS. 4 to 6, the key cap 5 is arranged above the switch shaft sleeve seat 1 and the two balance shaft sleeve seats 3 and is fixedly connected to the switch shaft 2 and the two balance shafts 4. When the key cap 5 is pressed down, the switch shaft 2 can be driven to move downwardly, and when the key cap 5 is released, it can follow the spring (not shown in the figures) and the switch shaft 2 to move upwardly to reset.

As shown in FIGS. 1 and 4 to 6, the key structure 10 further comprises a fixing plate 6. The switch shaft sleeve seat 1 and the sleeve bodies 31 are connected to the fixing plate 6 in a penetrating manner. The annular stoppers 33 are arranged below the fixing plate 6, and are stopped and limited by the fixing plate 6. Each two inclined protruding pieces 3123 are arranged above the fixing plate 6 and are stopped and limited by the fixing plate 6, and two clamping hooks 11 are arranged below the fixing plate 6, and are stopped and limited by the fixing plate 6.

As shown in FIGS. 1, 3 and 5 to 6, the key structure 10 further comprises a balance rod 7. The balance rod 7 penetrates one of each two concave furrows 3331 and one of each two penetrating holes 3121, and is pivotally connected to the two balance shafts 4 at two ends.

The balance rod 7 has a transverse rod 71 and two longitudinal rods 72 extending from two ends of the transverse rod 71. The two ends of the transverse rod 71 each penetrate one of each two concave furrows 3331. The longitudinal rods 72 each penetrate one of each two penetrating holes 3121.

As shown in FIGS. 1 to 6, in the use states of the key structure 10 and the balance shaft sleeve seat 3, a side of a sleeve body 31 has an adjacent side edge 32 arranged adjacent to the switch shaft sleeve seat 1, and a top of the sleeve body 31 is provided with a through hole 311 located in the middle of the adjacent side edge 32, the through hole 311 defines a central axis d and a minor axis plane a and a major axis plane b intersecting at the central axis d, the minor axis plane a is arranged perpendicular to the adjacent side edge 32, the major axis plane b is arranged perpendicular to the minor axis plane a, the appearance of the sleeve body 31 is symmetrically set with the minor axis plane a as a reference, and the appearance of the sleeve body 31 is asymmetrically set with the major axis plane b as a reference, so that the two balance shaft sleeve seats 3 can be injection molded with the same mold, so as to achieve the effect of saving manufacturing costs.

In addition, the appearance of the sleeve body 31 is symmetrical in the up and down direction with the minor axis plane a as a reference, and the appearance of the sleeve body 31 is asymmetrical in the left and right direction with the major axis plane b as reference. Therefore, the left and right sides of the balance shaft sleeve seat 3 can be different in structure and width, so that the structure and width of the balance shaft sleeve seat 3 is more free and unlimited in design, thereby allowing the distance between the balance shaft sleeve seat 3 and the switch shaft sleeve seat 1 to increase. As a result, the structure and width of the switch shaft sleeve seat 1 have space to change, so as to achieve the advantage of free appearance design of the balance shaft sleeve seat 3 and the switch shaft sleeve seat 1.

The sleeve body 31 of this embodiment has two transverse side walls 312 and a longitudinal side wall 313 connected on a side of the two transverse side walls 312, and is provided with a transparent indentation 314 formed on the other side of the two transverse side walls 312, so that the sleeve body 31 is a U-shaped frame body, wherein the two transverse side walls 312 are symmetrically set in the up and down direction with the minor axis plane a as a reference, and the longitudinal side wall 313 and the transparent indentation 314 are asymmetrically set in the left and right direction with the major axis plane b as a reference. Moreover, the width of the sleeve body 31 is reduced by the thickness of a longitudinal side wall 313, so that the distance between the balance shaft sleeve seat 3 and the switch shaft sleeve seat 1 is increased, and thus the appearance design of the balance shaft sleeve seat 3 and the switch shaft sleeve seat 1 is more free.

In summary, the key structure and its balance shaft sleeve seat can indeed achieve the intended purpose of use and solve the defects of the prior art, and have industrial applicability. Moreover, the embodiments described above are only preferred embodiments for sufficiently explaining the disclosed embodiments, and the scope of protection is not limited thereto. The equivalent substitutions or transformations made by a person skilled in the art on the basis of the present disclosure are all within the scope of protection of the present invention.

The invention claimed is:

1. A key structure, comprising:

a switch shaft sleeve seat;

a switch shaft accommodated in the switch shaft sleeve seat, wherein a top end of the switch shaft penetrates a top of the switch shaft sleeve seat and is movable relative to the switch shaft sleeve seat;

two balance shaft sleeve seats arranged on two sides of the switch shaft sleeve seat, wherein each of the balance shaft sleeve seats comprises a sleeve body, a side of each of the sleeve bodies comprises an adjacent side edge arranged adjacent to the switch shaft sleeve seat, and a top of each of the sleeve bodies comprises a through hole located in the middle of the adjacent side edge, each of the through holes defines a central axis and a minor axis plane and a major axis plane intersecting at the central axis, wherein the minor axis planes are arranged perpendicular to the adjacent side edges, the major axis planes are arranged perpendicular to the minor axis planes, and an appearance of each of the sleeve bodies is symmetrically set with the minor axis plane as a reference and asymmetrically set with the major axis plane as a reference;

two balance shafts respectively disposed in the sleeve bodies, wherein top ends of the balance shafts penetrate the through holes; and a key cap arranged above the switch shaft sleeve seat and the two balance shaft sleeve seats and fixedly connected to the switch shaft and the two balance shafts.

2. The key structure according to claim 1, wherein the key structure further comprises a fixing plate, the switch shaft sleeve seat and the sleeve bodies are connected to the fixing plate in a penetrating manner, an annular stopper extends from each of the sleeve bodies, and the annular stoppers are arranged below the fixing plate and are stopped and limited by the fixing plate.

3. The key structure according to claim 2, wherein each of the sleeve bodies comprises two transverse side walls and a longitudinal side wall connected on a side of the two transverse side walls, and is provided with a transparent indentation formed on an other side of the two transverse side walls, and each of the two transverse side walls are symmetrically set with the minor axis planes as a reference.

4. The key structure according to claim 3, wherein each of the annular stoppers comprises two transverse sections and a first longitudinal section and a second longitudinal section connected on two sides of the two transverse sections, an interval space is formed between the transverse sections and the transverse side walls, each of the two transverse sections are symmetrically set with the minor axis planes as a reference, the first longitudinal sections are molded by extending integrally with the longitudinal side walls, and the second longitudinal sections are arranged corresponding to the transparent indentations and are molded by extending integrally with each two transverse side walls.

5. The key structure according to claim 4, wherein the key structure further comprises a balance rod, a top of each of the second longitudinal sections is recessed with two concave furrows that are symmetrically set with the minor axis planes as a reference, each of the two transverse side walls are provided with two penetrating holes that are symmetrically set with the minor axis planes as a reference, and the balance rod penetrates one of each two concave furrows and one of each two penetrating holes, and is pivotally connected to the two balance shafts at two ends.

6. The key structure according to claim 5, wherein the balance rod comprises a transverse rod and two longitudinal rods extending from two ends of the transverse rod, and two ends of the transverse rod each penetrate one of each two concave furrows, and the longitudinal rods each penetrate one of each two penetrating holes.

7. The key structure according to claim 4, wherein an embedding groove is provided on an outer side of each of the second longitudinal sections, the embedding grooves comprise a shape that is symmetrically set with the minor axis planes as a reference, two clamping hooks embedded into the embedding grooves extend from two sides of the switch shaft sleeve seat, and the two clamping hooks are arranged below the fixing plate and are stopped and limited by the fixing plate.

8. The key structure according to claim 3, wherein two first protrusions that are symmetrically set with the minor axis planes as a reference extend from inner sides of each two transverse side walls, two second protrusions extend from two sides of the balance shafts, and the second protrusions are arranged below the first protrusions and are stopped and limited by the first protrusions.

9. The key structure according to claim 3, wherein two inclined protruding pieces that are symmetrically set with the minor axis planes as a reference extend from outer sides of each two transverse side walls, each two inclined protruding pieces gradually increase in distance toward the annular stoppers, and each two inclined protruding pieces are arranged above the fixing plate and are stopped and limited by the fixing plate.

10. A balance shaft sleeve seat of a key structure, wherein the key structure has a switch shaft sleeve seat, and the balance shaft sleeve seat comprises:

a sleeve body, a side of which has an adjacent side edge arranged adjacent to the switch shaft sleeve seat, and a top of which is provided with a through hole located in a middle portion of the adjacent side edge, wherein the through hole defines a central axis and a minor axis plane and a major axis plane intersecting at the central axis, the minor axis plane is arranged perpendicular to the adjacent side edge, the major axis plane is arranged perpendicular to the minor axis plane, and an appearance of the sleeve body is symmetrically set with the minor axis plane as a reference and asymmetrically set with the major axis plane as a reference.

11. The balance shaft sleeve seat of the key structure according to claim 10, wherein the sleeve body comprises two transverse side walls and a longitudinal side wall connected on a side of the two transverse side walls, and is provided with a transparent indentation formed on an other side of the two transverse side walls, and the two transverse side walls are symmetrically set with the minor axis plane as a reference.

12. The balance shaft sleeve seat of the key structure according to claim 11, wherein an annular stopper extends from the sleeve body, the annular stopper comprises two transverse sections and a first longitudinal section and a second longitudinal section connected on two sides of the two transverse sections, an interval space is formed between the transverse sections and the transverse side walls, the two transverse sections are symmetrically set with the minor axis plane as a reference, the first longitudinal section is integrally extended and molded with the longitudinal side wall, and the second longitudinal section is arranged corresponding to the transparent indentation and is integrally extended and molded with the two transverse side walls.

13. The balance shaft sleeve seat of the key structure according to claim 12, wherein a top of the second longitudinal section is recessed with two concave furrows that are symmetrically set with the minor axis plane as a reference, the two transverse side walls are provided with two penetrating holes that are symmetrically set with the minor axis plane as a reference, an embedding groove is provided on an outer side of the second longitudinal section, and a shape of the embedding groove is symmetrically set with the minor axis plane as a reference.

14. The balance shaft sleeve seat of the key structure according to claim 12, wherein two first protrusions that are symmetrically set with the minor axis plane as a reference extend from inner sides of the two transverse side walls, two inclined protruding pieces that are symmetrically set with the minor axis plane as a reference extend from outer sides of the two transverse side walls, and the two inclined protruding pieces gradually increase in distance toward the annular stop.

* * * * *